United States Patent
Chu et al.

(10) Patent No.: US 10,787,055 B2
(45) Date of Patent: Sep. 29, 2020

(54) METHOD AND APPARATUS OF VEHICLE HEAT DISSIPATION, COMPUTER-READABLE STORAGE MEDIUM

(71) Applicant: Beijing Xiaomi Mobile Software CO., LTD., Beijing (CN)

(72) Inventors: Yue Yue Chu, Beijing (CN); Yan Xie, Beijing (CN)

(73) Assignee: Beijing Xiaomi Mobile Software CO., LTD., Beijing (CN)

( * ) Notice: Subject to any disclaimer, the term of this patent is extended or adjusted under 35 U.S.C. 154(b) by 157 days.

(21) Appl. No.: 15/950,607

(22) Filed: Apr. 11, 2018

(65) Prior Publication Data
US 2018/0312033 A1    Nov. 1, 2018

(30) Foreign Application Priority Data
Apr. 26, 2017  (CN) .......................... 2017 1 0281586

(51) Int. Cl.
*B60H 1/00* (2006.01)
*H04W 4/40* (2018.01)
(Continued)

(52) U.S. Cl.
CPC .......... *B60H 1/00771* (2013.01); *B60H 1/32* (2013.01); *G01S 11/06* (2013.01); *G01V 7/16* (2013.01);
(Continued)

(58) Field of Classification Search
CPC .. B60H 1/00771; B60H 1/00735; B60H 1/32; H04W 4/90; H04W 4/40; H04W 4/021; G01S 11/06; G01V 7/16; H04L 67/12
See application file for complete search history.

(56) References Cited

U.S. PATENT DOCUMENTS 6,186,886 B1 * 2/2001 Farrington ............. B60H 1/243
454/124
6,662,572 B1 * 12/2003 Howard ............. B60H 1/00264
62/235.1
(Continued)

FOREIGN PATENT DOCUMENTS

| CN | 104344503 A | 2/2015 |
| CN | 104453535 A | 3/2015 |
| CN | 104626919 A | 5/2015 |

OTHER PUBLICATIONS

Combined Office Action and Search Report dated Feb. 11, 2019 in Chinese Patent Application No. 201710281586.7, 25 pages (with English translation and English translation of categories of cited documents).

(Continued)

*Primary Examiner* — Calvin Cheung
(74) *Attorney, Agent, or Firm* — Oblon, McClelland, Maier & Neustadt, L.L.P.

(57) ABSTRACT

The disclosure relates to an apparatus, a method of vehicle heat dissipation and computer-readable storage medium. The method includes determining whether a vehicle is located in a safety zone; acquiring environment data in the safety zone when the vehicle is located in the safety zone, wherein the environment data includes information on vehicle interior environment and vehicle exterior environment; and controlling the vehicle to dissipate heat based on the environment data.

17 Claims, 10 Drawing Sheets

(51) Int. Cl.
*H04W 4/021* (2018.01)
*B60H 1/32* (2006.01)
*H04W 4/90* (2018.01)
*G01S 11/06* (2006.01)
*G01V 7/16* (2006.01)
*H04L 29/08* (2006.01)

(52) U.S. Cl.
CPC ............ *H04W 4/021* (2013.01); *H04W 4/40* (2018.02); *H04W 4/90* (2018.02); *H04L 67/12* (2013.01)

(56) References Cited

U.S. PATENT DOCUMENTS

| | | | |
|---|---|---|---|
| 7,027,912 B1* | 4/2006 | Metzger | B60H 1/00778 123/179.4 |
| 2004/0076015 A1* | 4/2004 | Aoki | B60H 1/00735 362/503 |
| 2005/0140180 A1* | 6/2005 | Hesch | B60J 5/0452 296/208 |
| 2006/0179853 A1 | 8/2006 | Vosburgh | |
| 2009/0009321 A1 | 1/2009 | McClellan et al. | |
| 2010/0117820 A1 | 5/2010 | Mitschele | |
| 2011/0136424 A1* | 6/2011 | Park | B60H 1/00278 454/75 |
| 2012/0044063 A1 | 2/2012 | McClellan et al. | |
| 2015/0273975 A1* | 10/2015 | Kim | B60H 1/00828 454/139 |
| 2015/0306940 A1 | 10/2015 | Salter et al. | |
| 2016/0012726 A1 | 1/2016 | Wang | |
| 2016/0159200 A1 | 6/2016 | Kim | |
| 2016/0200166 A1* | 7/2016 | Stanek | H04W 4/44 165/202 |
| 2016/0261425 A1* | 9/2016 | Horton | H04L 12/2816 |
| 2017/0046957 A1* | 2/2017 | Jordens | B60H 1/00778 |
| 2017/0309170 A1 | 10/2017 | Wang | |
| 2019/0101922 A1* | 4/2019 | Matsumura | G01S 19/14 |
| 2019/0225209 A1* | 7/2019 | Seki | B60H 1/00778 |
| 2019/0272753 A1* | 9/2019 | Homutescu | G01K 1/026 |

OTHER PUBLICATIONS

Extended European Search Report dated Aug. 29, 2018 in Patent Application No. 18169344.1, 8 pages.

* cited by examiner

METHOD AND APPARATUS OF VEHICLE HEAT DISSIPATION, COMPUTER-READABLE STORAGE MEDIUM

CROSS-REFERENCE TO RELATED APPLICATIONS

This application claims priority to Chinese Patent Application No. 201710281586.7, filed with the State Intellectual Property Office of P.R.C. on Apr. 26, 2017, the entire contents of which are incorporated herein by reference.

TECHNICAL FIELD

The present disclosure relates to vehicle control, and particularly to a method, an apparatus of vehicle heat dissipation and computer-readable storage medium.

BACKGROUND

With the continuous improvement of living standards, a vehicle has become a very important transportation tool in our daily life. When the vehicle is parked, a temperature of the vehicle interior environment can change in accordance with the surrounding environment. When the temperature of the vehicle interior environment rises, the vehicle needs to dissipate heat to cool down the vehicle interior environment.

At present, a user proactively opens the sunroof or the doors of the vehicle when heat dissipation is needed. The air can circulate between the vehicle interior environment and the exterior environment, until the vehicle interior temperature lowers to be the same as the outside environment temperature, to complete the heat dissipation of the vehicle interior environment.

However, after the user leaves the vehicle, no heat dissipation can be performed to the vehicle interior environment, if the temperature of the vehicle interior environment is high.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method of vehicle heat dissipation. The method includes determining whether a vehicle is located in a safety zone; acquiring environment data in the safety zone when the vehicle is located in the safety zone, wherein the environment data includes information on vehicle interior environment and vehicle exterior environment; and controlling the vehicle to dissipate heat based on the environment data.

In an example, the environment data includes a first temperature data including a temperature of the vehicle interior environment, and a second temperature data including a temperature of the vehicle exterior environment.

According to an aspect, when acquiring the environment data in the safety zone, the method includes acquiring the first temperature data; determining whether the temperature of the vehicle interior environment is greater than a temperature threshold; and acquiring the second temperature data when the temperature of the vehicle interior environment is greater than the temperature threshold.

According to an aspect, when controlling the vehicle to dissipate heat based on the environment data, the method includes determining whether the temperature of the vehicle interior environment is greater than the temperature of the vehicle exterior environment; and controlling the vehicle to dissipate heat when the temperature of the vehicle interior environment is greater than the temperature of the vehicle exterior environment.

According to another aspect, the method includes controlling the vehicle to refrigerate when the temperature of the vehicle interior environment is not greater than the temperature of the vehicle exterior environment.

In an example, the environment data includes weather information indicating weather in an area of the safety zone, and controlling the vehicle to dissipate heat based on the environment data includes determining whether the weather in the area of the safety zone matches preset weather based on the weather information; and controlling the vehicle to dissipate heat when the weather in the area of the safety zone matches the preset weather.

According to yet another aspect, when determining whether the vehicle is located in the safety zone, the method includes acquiring geographic location information of the vehicle; and determining that the vehicle is located in the safety zone when a geographical location indicated by the geographic location information is within the safety zone.

According to yet another aspect, when determining whether the vehicle is located in the safety zone, the method includes determining whether a vehicle terminal in the vehicle is connected to a network; determining whether a signal strength of the network is greater than a signal threshold after determining that the vehicle terminal is connected to the network; and determining that the vehicle is in the safety zone when the signal strength of the network is greater than the signal threshold.

According to yet another aspect, a gravity sensor is embedded underneath the safety zone in advance, and determining whether the vehicle is located in the safety zone includes receiving a gravity sensing signal sent from the gravity sensor and forwarded by a server, wherein the gravity sensing signal is a signal that is generated when the gravity sensor detects gravity greater than a gravity trigger threshold; and determining that the vehicle is located in the safety zone based on the gravity sensing signal.

In an example, the environment data includes a first temperature data including a temperature of the vehicle interior environment, and weather information indicating weather in an area of the safety zone.

According to an aspect, the method includes controlling the vehicle to stop heat dissipation when the temperature of the vehicle interior environment is not greater than a temperature threshold; or updating the weather information, and controlling the vehicle to stop the heat dissipation when the weather indicated by the weather information does not match a preset weather.

Aspects of the disclosure also provide an apparatus of vehicle heat dissipation. The apparatus includes a processor and a memory for storing instructions executable by the processor. The processor is configured to determine whether a vehicle is located in a safety zone; acquire environment data in the safety zone when the vehicle is located in the safety zone, wherein the environment data includes information on vehicle interior environment and vehicle exterior environment; and controlling the vehicle to dissipate heat based on the environment data.

Aspects of the disclosure also provide a non-transitory computer-readable storage medium storing instructions that, when executed by one or more processors of a computing device, cause the computing device to determine whether a vehicle is located in a safety zone; acquire environment data in the safety zone when the vehicle is located in the safety zone, wherein the environment data includes information on vehicle interior environment and vehicle exterior environment; and control the vehicle to dissipate heat based on the environment data.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
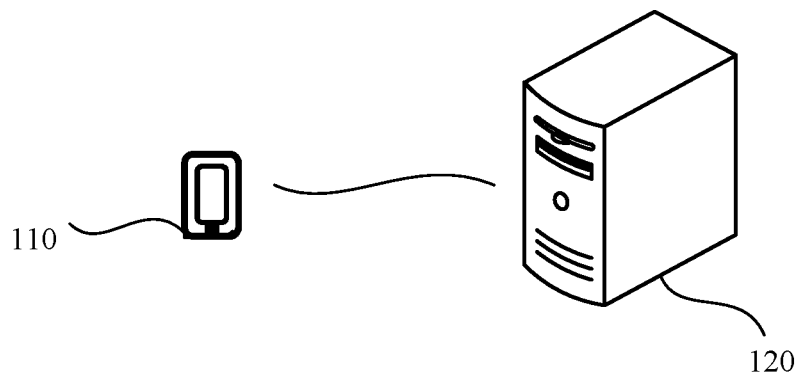
FIG. 1 is a diagram of an implementation environment of a vehicle heat dissipation method shown in accordance with some exemplary aspects of the present disclosure.

FIG. 1 is a diagram illustrating an implementation environment of a vehicle heat dissipation method in accordance with some aspects of the present disclosure. As shown in FIG. 1, the implementation environment can include a terminal 110 and a server 120.

The terminal 110 is installed in the vehicle to acquire relevant real-time data surrounding the vehicle. The terminal 110 can include a mobile phone, a vehicle terminal, a processing device, or other terminal devices in the vehicle, and will not be limited in the present aspect.

Moreover, a safety zone may include a private garage, a dedicated parking space, or other more private locations, and will not be limited in the present disclosure.

The terminal 110 can be used to determine whether the vehicle is located in a preset safety zone. When the vehicle is located in the safety zone, the terminal 110 can also be used to acquire the current environment data in the safety zone, and control the vehicle to dissipate heat in accordance with the environment data.

The environment data indicates vehicle interior environment and vehicle exterior environment.

The server 120 performs data interaction with the terminal 110, to assist the terminal 110 to determine whether the vehicle is within the preset safety zone.

Noticeably, in order to ensure that the vehicle may not be stolen due to vehicle heat dissipation process, generally, the present aspect can be applied when the vehicle is stopped and the key is pulled out by the user. Of course, the present aspect can also be applied to, but is not limited to, other scenarios where the vehicle safety can be guaranteed.

Figure 2:
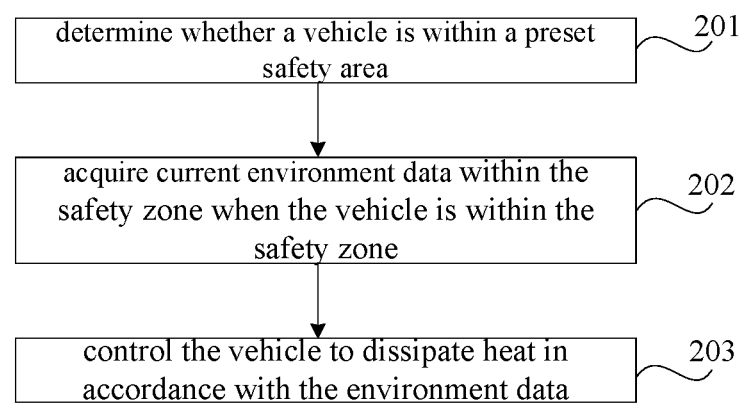
FIG. 2 is a flow chart of a vehicle heat dissipation method shown in accordance with an exemplary aspect of the present disclosure.

FIG. 2 is a flow chart of a vehicle heat dissipation method in accordance with an aspect of the present disclosure. As shown in FIG. 2, the vehicle heat dissipation method is applied to a terminal and includes the following steps:

At step 201, determining whether a vehicle is within a preset safety zone.

At step 202, acquiring current environment data within the safety zone when the vehicle is within the safety zone.

The environment data indicates vehicle interior environment and vehicle exterior environment.

At step 203, controlling the vehicle to dissipate heat in accordance with the environment data.

In summary, in the vehicle heat dissipation method provided by the aspect of the present disclosure, by determining the vehicle is located in a preset safety zone, acquiring the current environment data of vehicle interior environment and vehicle exterior environment, and controlling the vehicle to dissipate heat in accordance with the environment data, heat dissipation can be performed timely for the vehicle after the user leaves the vehicle, on the basis of guaranteeing vehicle safety, thereby improving the efficiency of the vehicle heat dissipation.

Figure 3:
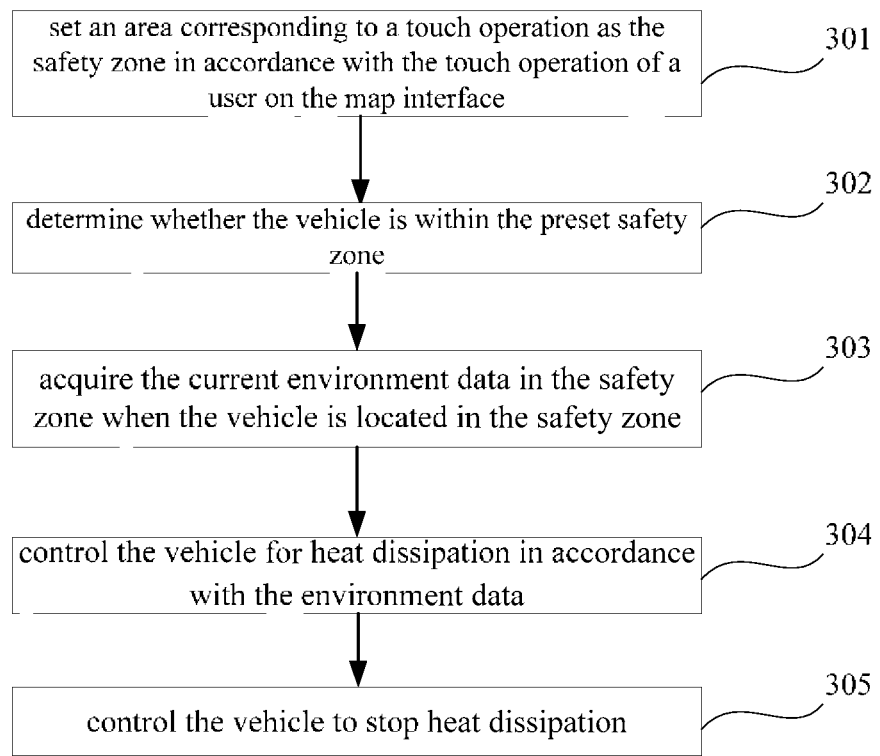
FIG. 3 is a flow chart of a vehicle heat dissipation method shown in accordance with an exemplary aspect of the present disclosure.

FIG. 3 is a flow chart of a vehicle heat dissipation method in accordance with an aspect of the present disclosure. As shown in FIG. 3, the vehicle heat dissipation method can be applied to a terminal and can include the following steps:

At step 301, setting an area corresponding to a touch operation of a user on a map interface as a safety zone in accordance with the touch operation.

In the process of vehicle heat dissipation, the vehicle may be parked in the preset safety zone in order to guarantee that the user properties are not subjected to loss due to vehicle parking location. Therefore, the user needs to pre-select the safety zone displayed on the map interface of the terminal. For example, the user can select the safety zone displayed on the map interface of a vehicle terminal, can select the safety zone displayed on the map interface of a display screen pre-installed in the vehicle and connected to a processing device of the vehicle, and can select the safety zone displayed on the map interface of a mobile terminal which establish an association with the vehicle. The present disclosure is not limited hereto.

Also, after displaying the map interface, the user selected safety zone can be determined by the terminal based on the touch operation of the user on the map interface. Here, the user operation may be a sliding operation, or a click operation, and is not limited in the aspects of the present disclosure.

When the terminal detects that the user operation is the sliding operation, an area enclosed with track formed by the sliding operation can be set as the safety zone. When the terminal detects that the user operation is a click operation, a click point corresponding to the click operation can be set as a center, and an area formed with the center and a radius of a preset length can be set as the safety zone.

Noticeably, when the mobile terminal displays a map interface and a safety zone is selected from the displayed map interface, the selected safety zone can be sent by the mobile terminal to a server. The server can forward the safety zone to a terminal of the vehicle such that the terminal of the vehicle can obtain the safety zone. Here, the terminal of the vehicle represents a terminal provided in the vehicle. For example, the terminal of the vehicle can be a vehicle terminal and a processing device of the vehicle etc.

Figure 4:
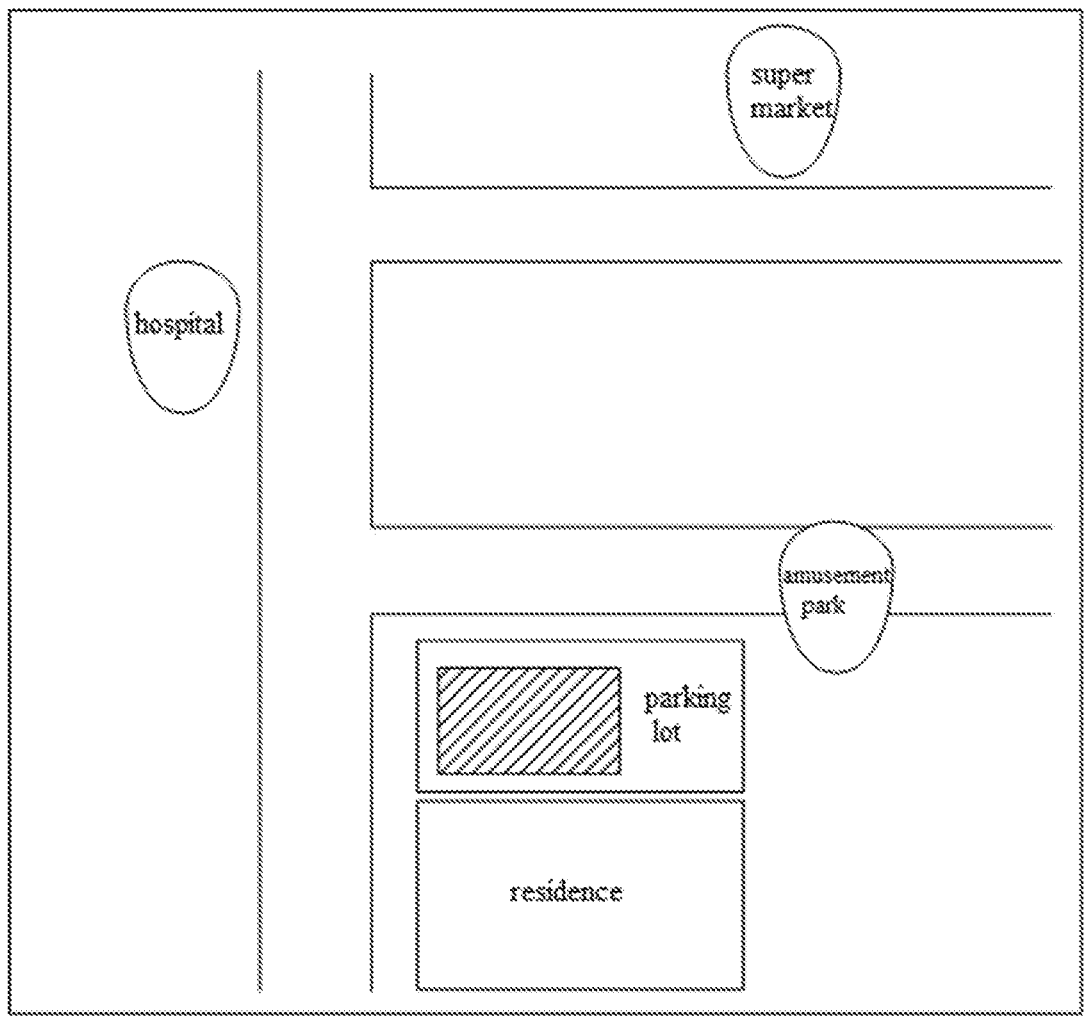
FIG. 4 is a diagram of a safety zone shown in accordance with an exemplary aspect of the present disclosure.
Figure 5:
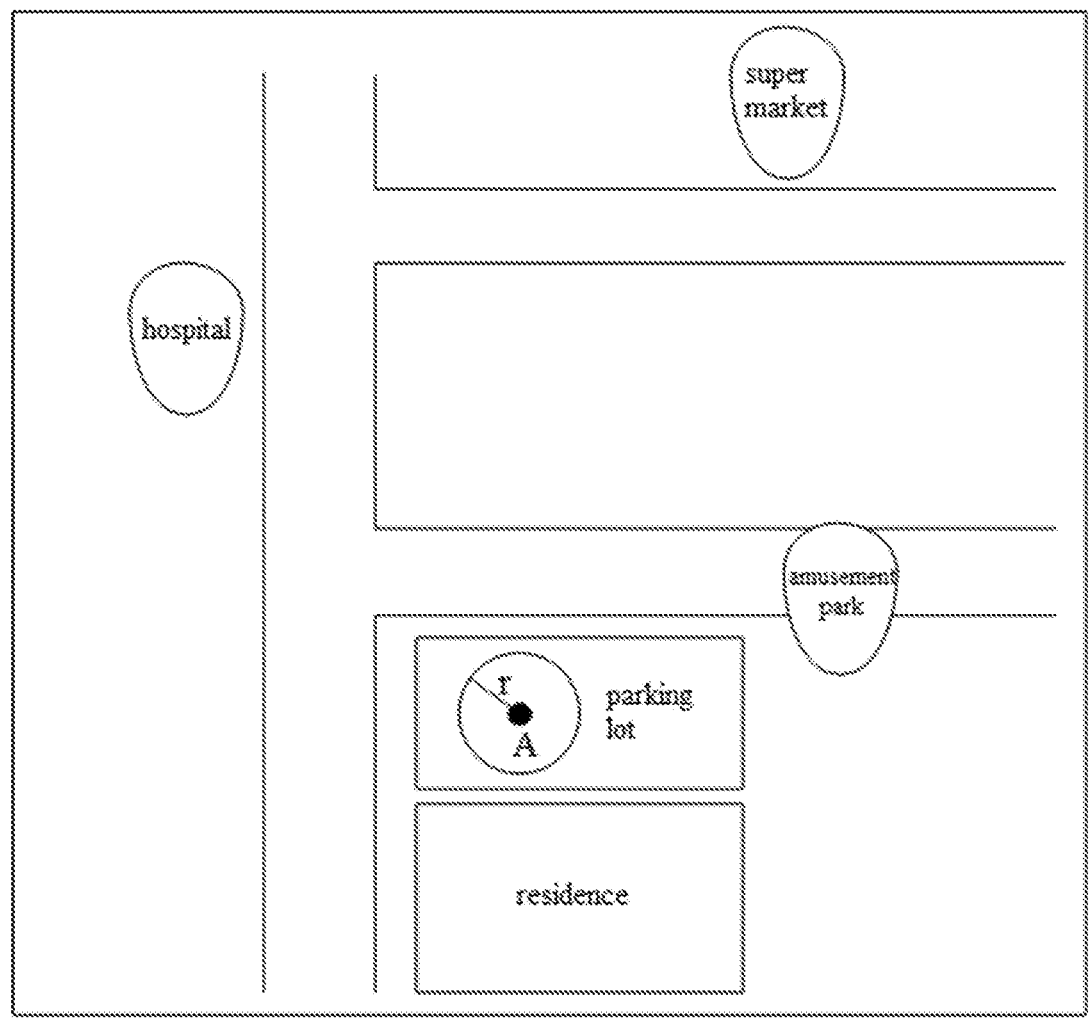
FIG. 5 is a diagram of a safety zone shown in accordance with an exemplary aspect of the present disclosure.

Correspondingly, as shown in FIG. 4 and FIG. 5, a residential area adjacent to a parking space can guarantee the vehicle safety and avoid incidents of vehicle burglar. Referring to FIG. 4, the boundary shape of the safety zone may be a rectangle shown in the hatched portion of FIG. 4, and the rectangle may be drawn by the user on the map interface using the sliding operation. Referring to FIG. 5, the boundary shape of the safety zone may be a circle having a point A as the center and a radius r as shown in FIG. 5, wherein the center of point A in the circle may be the click point clicked by the user on the map interface. Of course, the boundary shape of the safety zone in the aspect of the present disclosure may be other irregular shapes.

The terminal can also determine the safety zone based on address information entered by the user. For example, if the user enters a parking lot of a shopping mall B at number X of road A, the terminal may determine the parking lot of the shopping mall B as the safety zone.

Additionally, whether the vehicle enters the safety zone can also be determined based on a network which the vehicle terminal on the vehicle accesses. The user can set on a network setting interface displayed on the terminal. The terminal can determine a preset network accessed by the vehicle when the vehicle enters the safety zone, in accordance with setting operation of the user on the network setting interface.

Moreover, in order to prevent the vehicle terminal from accessing the preset network when the vehicle approaches the safety zone, resulting in error determination that the vehicle is in the safety zone, the terminal may also need to set a preset signal threshold for determining signal strength in accordance with the user setting operation.

In addition, a gravity sensor may be embedded underneath the safety zone in advance, and a gravity sensing interface may be displayed on the terminal. A gravity trigger threshold input by a user on the gravity sensing interface may be received finally. In subsequent steps, when the gravity sensor detects that the applied gravity reaches the gravity trigger threshold, a gravity sensing signal can be sent to the server, and the server can forward the gravity sensing signal to the terminal. Thus, the vehicle can be determined within the safety zone.

Noticeably, in addition to the above described methods of setting the safety zone, the safety zone may be set in other ways, and the aspects of the present disclosure do not limit thereto.

At step 302, determining whether the vehicle is within the preset safety zone.

When the vehicle needs dissipate heat at a location, the terminal may first determine whether the vehicle is in the preset safety zone. If the vehicle is in the safety zone, the subsequent heat dissipation steps can be executed. If the vehicle is not in the safety zone, the subsequent heat dissipation steps may not be followed.

Corresponding to the step 301, the step 302 may include any of the steps 302a, 302b, and 302c in determining whether the vehicle is within the preset safety zone.

At step 302a, acquiring current geographic location information of the vehicle, and determining that the vehicle is located in the preset safety zone when the geographical location indicated by the current geographic location information is within the safety zone.

The geographic location information indicates the current location of the vehicle.

The terminal can obtain the geographic location information of the vehicle in real-time. After the geographic location information is obtained, the geographical location indicated by the geographic location information can be compared with the preset safety zone, to determine whether the current geographical location of the vehicle is located in the safety zone. If the current geographical location of the vehicle is located in the safety zone, the vehicle can be determined in the preset safety zone.

For example, the safety zone set by the user is a private garage near the residence C located at number Y of road A. If the geographic location information obtained by the terminal indicates that the vehicle is currently located on road B, the vehicle can be determined not in the safety zone. If the geographic location information obtained by the terminal indicates that the vehicle is currently located at number Y of the road A, whether or not the vehicle is located at the private garage near the residence C may be further determined in accordance with the coordinate data in the geographic location information. If the location indicated by the coordinate data is in the preset safety zone, the vehicle can be determined located in the safety zone.

At step 302b, determining whether the vehicle terminal in the vehicle is connected to the preset network, and determining whether the signal strength of the preset network is greater than a preset signal threshold after determining that the vehicle terminal is connected to the preset network. When the signal strength of the preset network is greater than the preset signal threshold, the vehicle is determined in the preset safety zone.

The preset network may be a wireless network, such as a Wireless Fidelity (WIFI) network. The preset signal threshold may be determined based on the maximum signal strength after the vehicle terminal is connected to the preset network.

Moreover, the preset network is usually a network in the user's residence. Only when the user stops the vehicle nearby the residence, the vehicle terminal can access the network of the user's residence. And only when the signal strength of the preset network is sufficiently strong, the vehicle parking location can be guaranteed adjacent to the residence. Therefore, the vehicle can be determined in the safety zone.

When the vehicle approaches the safety zone, the vehicle terminal in the vehicle can search and access the preset network. Thus, when the terminal detects that the vehicle terminal accesses the preset network, the vehicle can be determined nearby the safety zone, and whether the signal strength of the preset network is greater than the preset signal threshold can be determined subsequently.

As the vehicle approaches the safety zone, and finally stops in the safety zone, the signal strength of the preset network received by the vehicle terminal can reach the maximum. Thus, the signal strength of the preset network can be greater than the preset signal threshold, and the vehicle can be determined in the preset safety zone.

For example, when the vehicle approaches the residence, the vehicle terminal can continuously search for nearby wireless networks. When the wireless network provided by the user's residence is found, the wireless network can be connected, indicating that the vehicle is near the safety zone. As the vehicle continues approaching the residence, the signal strength of the wireless network continues increasing. When the vehicle is parked in the safety zone nearby the residence, the signal strength of the wireless network can be greater than the preset signal threshold, indicating that the vehicle is in the preset safety zone.

At step 302c, receiving the gravity sensing signal sent from the gravity sensor and forwarded by the server, and determining that the vehicle is located in the preset safety zone in accordance with the gravity sensing signal.

The gravity sensing signal can be a signal generated by the gravity sensor when gravity greater than a preset gravity trigger threshold is detected. The preset gravity trigger threshold can be determined in accordance with the weight of the vehicle.

In addition, the gravity sensor usually can be embedded in a position where an outsider cannot access. Thus, when the terminal receives the gravity sensing signal sent from the gravity sensor and forwarded by the server, the vehicle can be determined in the safety zone.

When the vehicle stops in the preset safety zone, the gravity sensor pre-embedded underneath the safety zone can sense the gravity generated by the vehicle, and the currently sensed gravity value can be compared with the preset gravity trigger threshold.

If the currently sensed gravity value is greater than the preset gravity trigger threshold, the gravity sensor can generate and transmit the gravity sensing signal to the server, and the server can forward the gravity sensing signal to the terminal. Upon receipt of the gravity sensing signal, the terminal can determine that the vehicle is in the preset safety zone.

For example, the gravity sensor may be embedded underneath a user's private garage. When the user parks the vehicle in the garage, the current gravity value can be detected by the gravity sensor, and compared with the preset gravity trigger threshold. If the currently detected gravity value is larger than the preset gravity trigger threshold, it may be determined that the vehicle has been parked in the private garage and has entered in the safety zone.

Noticeably, before the terminal determines whether the vehicle is in the preset safety zone, the terminal also needs to determine whether the vehicle is in a stationary state. If the vehicle is in the stationary state, the terminal can further determine whether the vehicle is in the safety zone.

For example, whether the vehicle is in the stationary state can be determined in accordance with vehicle speed. If the vehicle speed is less than a preset speed threshold, the vehicle may be considered in the stationary state. The preset speed threshold can be determined in accordance with the vehicle minimum speed.

At step 303, acquiring the current environment data in the safety zone when the vehicle is located in the safety zone.

The environment data can indicate the vehicle interior environment and the vehicle exterior environment. The environment data may include first temperature data indicating a temperature of the vehicle interior environment, second temperature data indicating a temperature of the vehicle exterior environment, and weather information indicating weather in the area of the safety zone.

In order to prevent the vehicle from being eroded by rain, wind and sand during the heat dissipation, the weather information of the safety zone may be obtained to determine whether the current weather is suitable for vehicle heat dissipation. After obtaining the weather information, the terminal evaluates whether the weather in the area of the safety zone matches preset weather in accordance with the weather information. When the weather in the area of the safety zone matches the preset weather, the current weather in the safety zone can be suitable for the heat dissipation, and no damage may be caused to the vehicle, thus the vehicle heat dissipation can be controlled in the subsequent steps.

For example, the weather indicated by the weather information may can sunny, rainy, snowy, hazy, dusty, windy and corresponding wind level, and the preset weather can be sunny. If the obtained weather information indicates a sunny day, the current weather matches the preset weather. If the obtained weather information does not indicate a sunny day, the current weather does not match the preset weather.

Noticeably, the preset weather may include one type of weather, or a plurality of types of weather, and the present aspect does not limit thereto.

After the terminal determines that the weather indicated by the weather information matches the preset weather, the temperature of the vehicle interior environment may also need to be compared with the temperature of the vehicle exterior environment, in order to determine a manner for controlling heat dissipation of the vehicle.

The terminal can obtain the first temperature data after determining that the current weather of the safety zone matches the preset weather, and evaluate whether the temperature of the vehicle interior environment indicated by the first temperature data is greater than a preset temperature threshold. If the temperature of the vehicle interior environment is not greater than the preset temperature threshold, no vehicle heat dissipation may be needed.

However, when the temperature of the vehicle interior environment is greater than the preset temperature threshold, the vehicle may need to perform the heat dissipation. Thus, the second temperature data may need to be obtained to determine a manner for controlling heat dissipation of the vehicle in the subsequent steps.

The preset temperature threshold can be adjusted in accordance with different seasons.

At step 304, controlling heat dissipation of the vehicle in accordance with the environment data.

After the terminal obtains the second temperature data, the temperature of the vehicle interior environment can be compared with the temperature of the vehicle exterior environment indicated by the second temperature data, to determine whether the temperature of the vehicle interior environment is greater than the temperature of the vehicle exterior environment, so as to select a different heat dissipation manner depending on the different environment data.

At step 304a, controlling the vehicle to dissipate heat when the temperature of the vehicle interior environment is greater than the temperature of the vehicle exterior environment.

The terminal can compare the temperature of the vehicle interior environment with the temperature of the vehicle exterior environment in accordance with the acquired environment data. If the temperature of the vehicle interior environment is greater than the temperature of the vehicle exterior environment, at least one of the doors, the windows, and the sunroof of the vehicle can be opened, such that the air inside the vehicle can circulate with the air outside the vehicle, thereby lowering the vehicle interior temperature to complete the vehicle heat dissipation.

At step 304b, controlling the vehicle to refrigerate when the temperature of the vehicle interior environment is not greater than the temperature of the vehicle exterior environment.

If the terminal determines that the temperature of the vehicle interior environment is not greater than the temperature of the vehicle exterior environment after evaluation, the vehicle may not open the doors, the windows, or the sunroof. Instead, vehicle refrigerating structure can be started for refrigeration, thereby lowering the vehicle interior temperature.

The vehicle refrigerating structure may be an air conditioner inside the vehicle, or may be other structures, and the aspect does not limit thereto.

At step 305, controlling the vehicle to stop heat dissipation.

The terminal may obtain the first temperature data continuously, in order to determine whether the vehicle needs to continue dissipating heat. When it is detected that the temperature of the vehicle interior environment is not greater than the preset temperature threshold, the vehicle interior temperature has decreased, and the vehicle heat dissipation may not be needed. Thus, the vehicle can be controlled to stop heat dissipation, and the vehicle doors, windows, and sunroof can be closed.

Moreover, the terminal can continuously obtain the weather information to update the original weather information. When the weather indicated by the updated weather information does not match the preset weather, the weather corresponding to the safety zone may be changed, and may no longer be suitable for the heat dissipation. Thus, the vehicle may need to stop the heat dissipation.

Noticeably, if the at least one of the vehicle doors, windows, and sunroof is opened for heat dissipation at the step 304, when the terminal detects the weather changes, such as changes to windy, rainy, and snowy, etc., the vehicle doors, windows, and sunroof may need to be closed. However, if the vehicle is controlled to dissipate heat by refrigeration at the step 304, when the terminal detects the weather changes, whether to continue the refrigeration can be determined based on the current weather, and is not limited in the present aspect.

In summary, in the vehicle heat dissipation method provided by the aspect of the present disclosure, by determining the vehicle is located in a preset safety zone, acquiring the current environment data of vehicle interior environment and vehicle exterior environment, and controlling the vehicle to dissipate heat in accordance with the environment data, heat dissipation can be performed timely for the vehicle after the user leaves the vehicle, on the basis of guaranteeing vehicle safety, thereby improving the efficiency of the vehicle heat dissipation.

Hereinafter, the apparatus of the aspects of the present disclosure may be used to implement the method of the aspects of the present disclosure. The details not disclosed in the apparatus in the aspects of the present disclosure, can be referred to the method in the aspects of the present disclosure.

Figure 6:
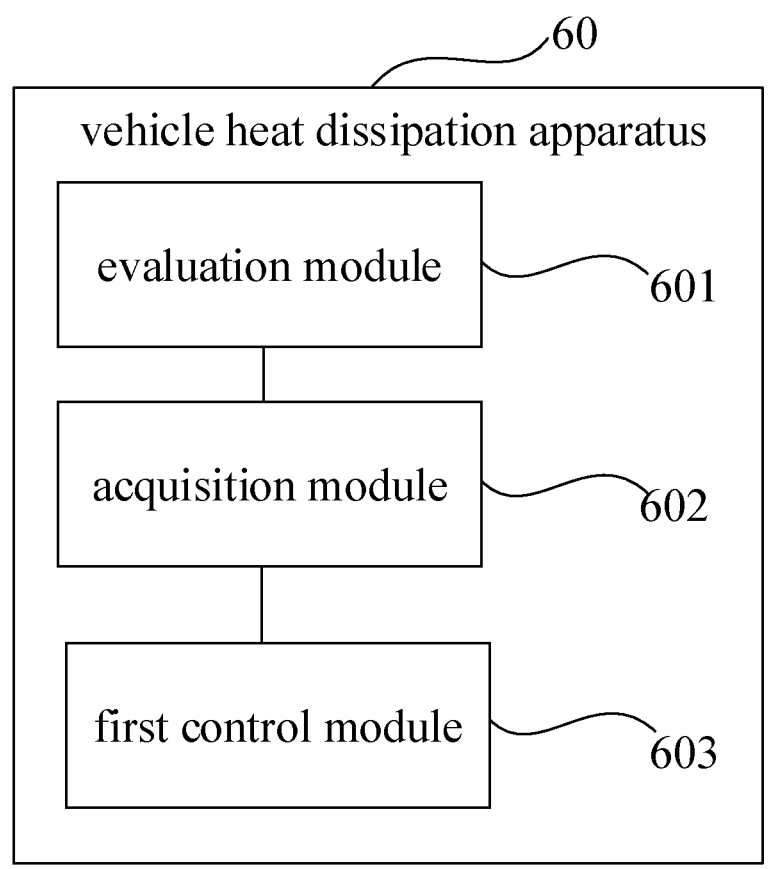
FIG. 6 is block diagram of a vehicle heat dissipation apparatus shown in accordance with an exemplary aspect of the present disclosure.

FIG. 6 is a block diagram of a vehicle heat dissipation apparatus in accordance with an aspect of the present disclosure. As shown in FIG. 6, the vehicle heat dissipation apparatus 60 can be applied to a terminal. The vehicle heat dissipation apparatus 60 can include an evaluation module 601, an acquisition module 602, and a first control module 603.

The evaluation module 601 can be configured to evaluate whether the vehicle is in a preset safety zone;

The acquisition module 602 can be configured to acquire current environment data within the safety zone when the vehicle is located within the safety zone. The environment data can be used to indicate vehicle interior environment and vehicle exterior environment.

The first control module 603 can be configured to control the vehicle to dissipate heat in accordance with the environment data.

In summary, in the vehicle heat dissipation method provided by the aspect of the present disclosure, by determining the vehicle is located in a preset safety zone, acquiring the current environment data of vehicle interior environment and vehicle exterior environment, and controlling the vehicle to dissipate heat in accordance with the environment data, heat dissipation can be performed timely for the vehicle after the user leaves the vehicle, on the basis of guaranteeing vehicle safety, thereby improving the efficiency of the vehicle heat dissipation.

In some aspects, the environment data includes the first temperature data indicating the temperature of the vehicle interior environment, and the second temperature data indicating the temperature of the vehicle exterior environment;

the acquisition module 602 is further configured to acquire the first temperature data, determine whether the temperature of the vehicle interior environment indicated by the first temperature data is greater than a preset temperature threshold, and acquire the second temperature data when the temperature of the vehicle interior environment is greater than the preset temperature threshold.

In some aspects, the first control module 603 is further configured to determine whether the temperature of the vehicle interior environment is greater than the temperature of the vehicle exterior environment indicated by the second temperature data, and control the vehicle to dissipate heat when the temperature of the vehicle interior environment is greater than the temperature of the vehicle exterior environment.

Figure 7:
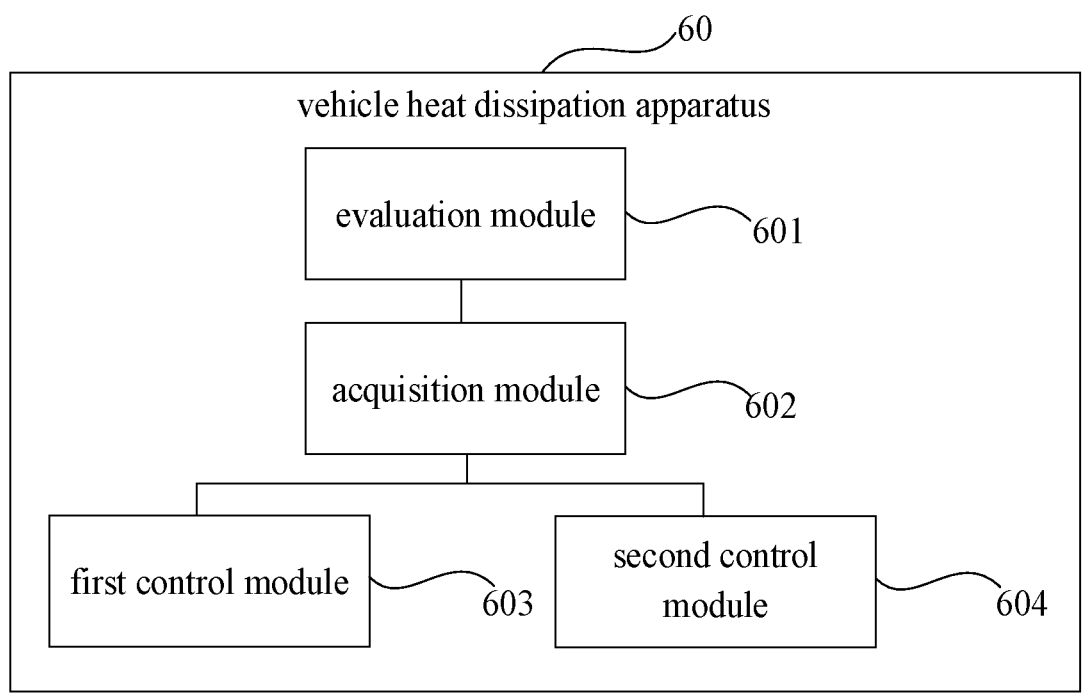
FIG. 7 is block diagram of a vehicle heat dissipation apparatus shown in accordance with an exemplary aspect of the present disclosure.

In some aspects, as shown in FIG. 7, the apparatus further includes a second control module 604.

The second control module 604 is configured to control the vehicle to refrigerate when the temperature of the vehicle interior environment is not greater than the temperature of the vehicle exterior environment.

In some aspects, the environment date further includes weather information indicating the weather in the area of the safety zone;

The first control module 603 is further configured to determine whether the weather in the area of the safety zone matches preset weather in accordance with the weather information, and control the vehicle to dissipate heat when the weather in the area of the safety zone matches the preset weather.

Figure 8:
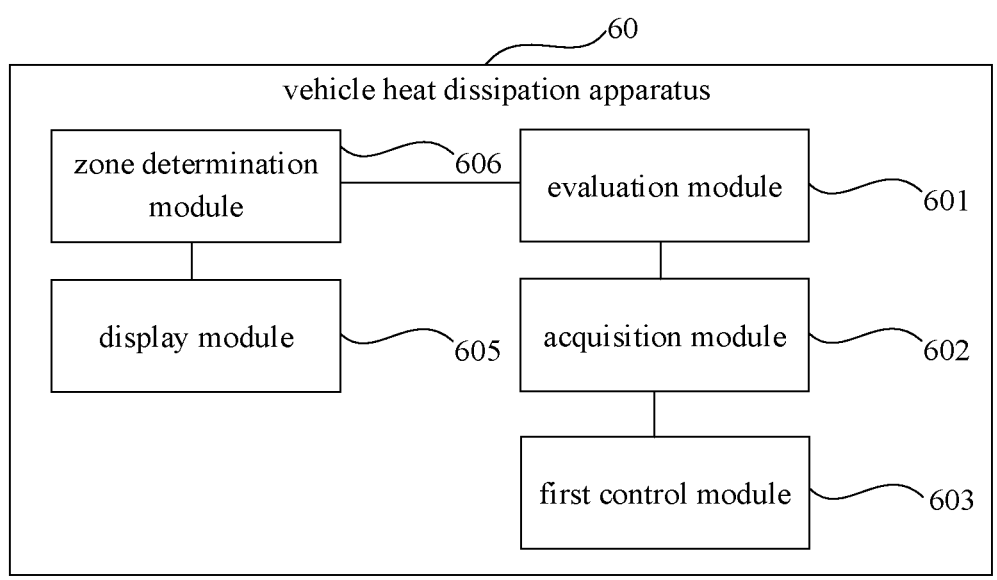
FIG. 8 is block diagram of a vehicle heat dissipation apparatus shown in accordance with an exemplary aspect of the present disclosure.

In some aspects, as shown in FIG. 8, the apparatus further includes a display module 605 and a zone determination module 606.

The display module 605 is configured to display a map interface;

The zone determination module 606 is configured to set an area corresponding to a touch operation of a user on the map interface as the safety zone in accordance with the touch operation.

In some aspects, the touch operation is a sliding operation, and the zone determination module 606 is further configured to set an area enclosed with track formed by the sliding operation as the safety zone;

or, the touch operation is a click operation, and the zone determination module 606 is further configured to set an area formed with a center and a radius of a preset length as the safety zone, wherein the center is a click point corresponding to the click operation.

In some aspects, the evaluation module 601 is further configured to acquire current geographic location information of the vehicle, and determine that the vehicle is located in the preset safety zone when geographical location indicated by the current geographic location information is within the safety zone.

In some aspects, the evaluation module 601 is further configured determine whether a vehicle terminal in the vehicle is connected to a preset network, determine whether signal strength of the preset network is greater than a preset signal threshold after determining that the vehicle terminal is connected to the preset network, and determine that the vehicle is in the preset safety zone when the signal strength of the preset network is greater than the preset signal threshold.

In some aspects, the safety zone is embedded with a gravity sensor there underneath;

the evaluation module 601 is further configured to receive a gravity sensing signal sent from the gravity sensor and forwarded by a server, and determine that the vehicle is located in the preset safety zone in accordance with the gravity sensing signal, wherein the gravity sensing signal is the signal generated when the gravity sensor detects gravity greater than a preset gravity trigger threshold.

Figure 9:
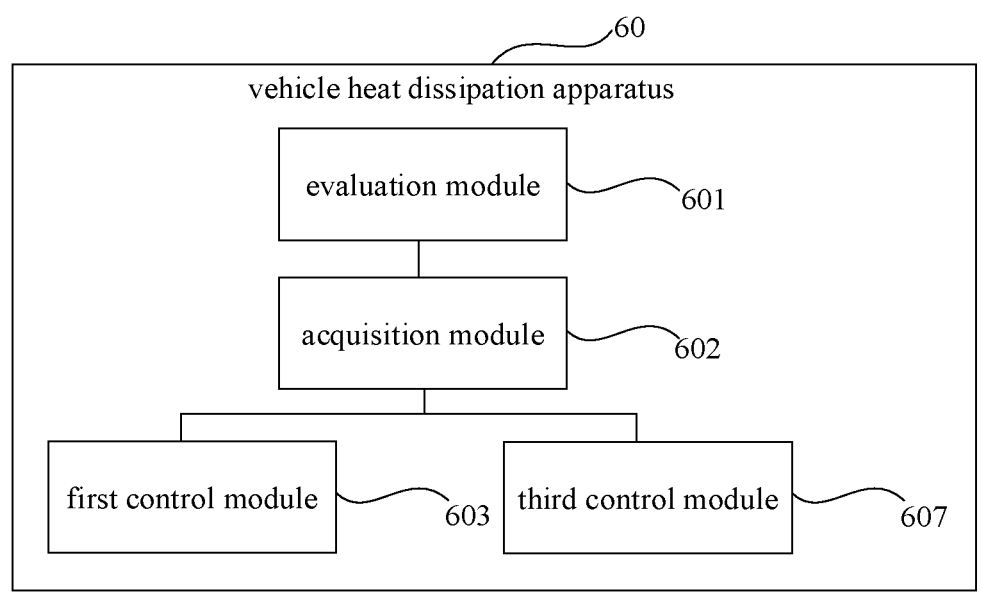
FIG. 9 is block diagram of a vehicle heat dissipation apparatus shown in accordance with an exemplary aspect of the present disclosure.

In some aspects, the environment data includes the first temperature data indicating a temperature of the vehicle interior environment, and the weather information indicating the weather in the area of the safety zone;

Referring to FIG. 9, the apparatus further includes a third control module 607.

The third control module 607 is configured to control the vehicle to stop heat dissipation, when the temperature of the vehicle interior environment is not greater than the preset temperature threshold;

or, the third control module 607 is further configured to update the weather information, and control the vehicle to stop heat dissipation when the weather indicated by the weather information does not match the preset weather.

In some aspects, the first control module 603 is further configured to control the vehicle to dissipate heat by opening at least one of the doors, the windows, and the sunroof of the vehicle, in accordance with the environment data.

In some aspects, the preset safety zone has a boundary shape of rectangle, circle, or irregular shape.

With respect to the apparatus of the above aspect, the specific method of operation performed by each module has been described in details in the aspect of the method, and the description thereof may not be described in details herein.

An exemplary aspect of the present disclosure also provides a vehicle heat dissipation apparatus capable of implementing the vehicle heat dissipation method provided by the present disclosure. The vehicle heat dissipation apparatus comprises: a processor and a memory storage storing instructions executed by the processor, wherein the processor is configured to:

determine whether a vehicle is located in a preset safety zone;

acquire current environment data in the safety zone when the vehicle is located in the safety zone. Here, the environment data indicates vehicle interior environment and vehicle exterior environment; and control the vehicle to dissipate heat in accordance with the environment data.

Figure 10:
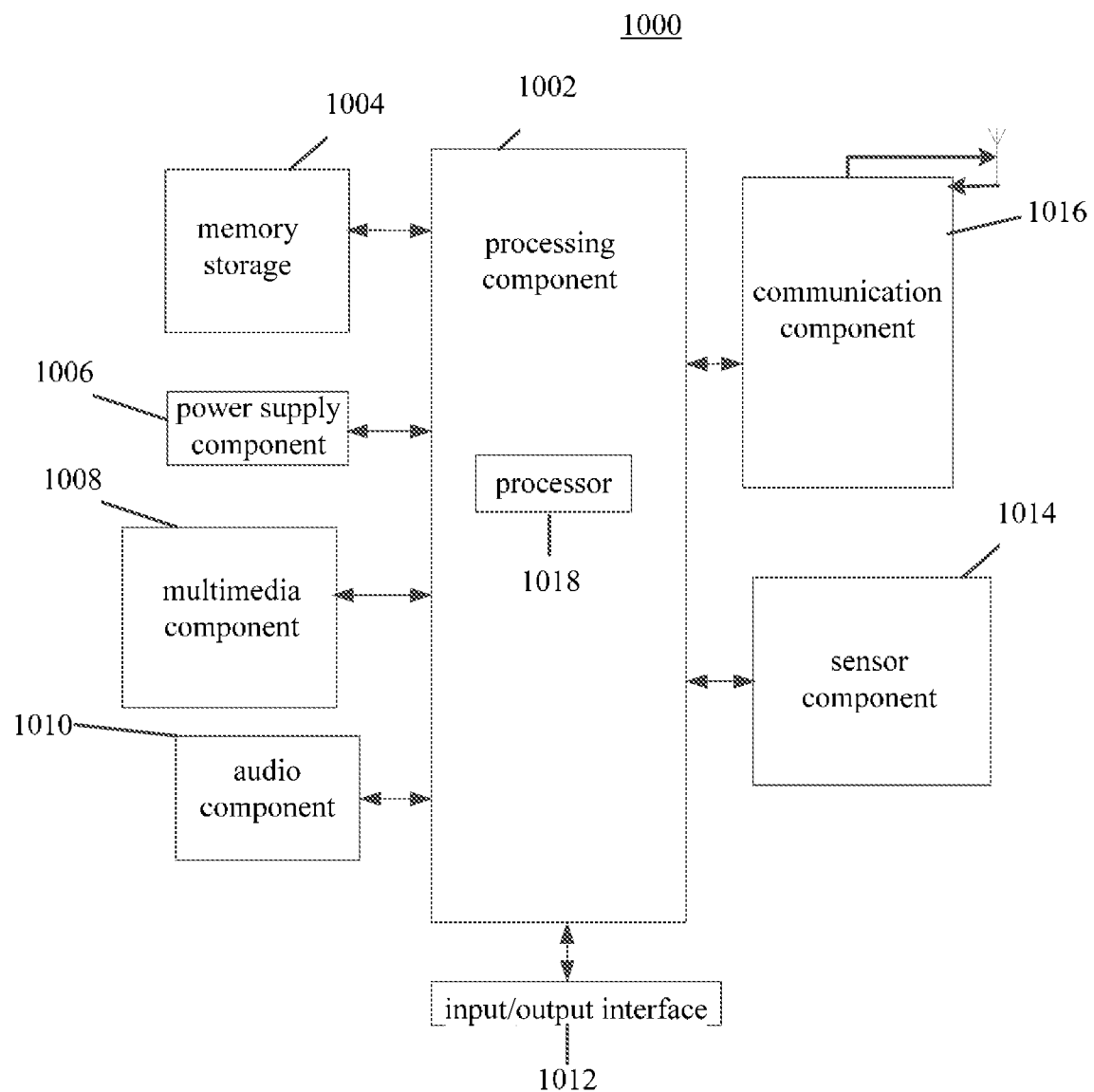
FIG. 10 is a block diagram of a vehicle heat dissipation apparatus shown in accordance with an exemplary aspect of the present disclosure.

FIG. 10 is a block diagram of a vehicle heat dissipation apparatus in accordance with an exemplary aspect of the present disclosure. For example, apparatus 1000 may be a mobile phone, a computer, a digital broadcast terminal, a messaging device, a game console, a tablet device, a medical device, a fitness device, a personal digital assistant, and the like.

As shown in FIG. 10, the apparatus 1000 may include one or more of the following components: a processing component 1002, a memory storage 1004, a power supply component 1006, a multimedia component 1008, an audio component 1010, an input/output (I/O) interface 1012, a sensor component 1014, and a communication component 1016.

The processing component 1002 generally can control the overall operation of the apparatus 1000, such as operations associated with display, phone call, data communication, camera operation, and recording operations. The processing component 1002 may include one or more processors 1018 to execute instructions, to complete all or part of the steps in the method described above. In addition, the processing component 1002 may include one or more modules to facilitate the interactions between the processing component 1002 and other components. For example, the processing component 1002 may include a multimedia module to facilitate interaction between the multimedia component 1008 and the processing component 1002.

The memory storage 1004 can be configured to store various types of data to support the operation of the apparatus 1000. Examples of such data can include instructions of any application or method, contact data, phonebook data, messages, pictures, videos, and the like, that operates on the apparatus 1000. The memory storage 1004 may be implemented by any type of volatile or nonvolatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or CD.

The power supply component 1006 can provide power to the various components of the apparatus 1000. The power supply component 1006 may include a power management system, one or more power supplies, and other components associated with generating, managing, and distributing power for the apparatus 1000.

The multimedia component 1008 may include a screen providing an output interface between the apparatus 1000 and the user. In some aspects, the screen may include a liquid crystal display (LCD) and a touch panel (TP). If the screen includes a touch panel, the screen may be implemented as a touch screen to receive input signals from the user. The touch panel can include one or more touch sensors to sense touches, slide, and gestures on touch panels. The touch sensors may sense not only the boundary of the touch or slide actions, but also the duration and pressure associated with the touch or slide operation. In some aspects, the multimedia component 1008 may include a front camera and/or a rear camera. When the apparatus 1000 is in an operating mode, such as a shooting mode or a video mode, the front camera and/or the rear camera can receive external multimedia data. Each front camera and rear camera can be a fixed optical lens system or have focal length and optical zoom capability.

The audio component 1010 can be configured to output and/or input an audio signal. For example, the audio component 1010 can include a microphone (MIC) that is configured to receive external audio signals when the apparatus 1000 is in the operating mode, such as a call mode, a recording mode, and a voice recognition mode. The received audio signals may be further stored in the memory storage 1004 or transmitted via the communication component 1016. In some aspects, the audio component 100 can also include a speaker for outputting the audio signals.

The I/O interface 1012 can provide the interface between the processing component 1002 and a peripheral interface module, the peripheral interface module may be a keyboard, a mouse, buttons, or the like. The buttons may include, but are not limited to, a home button, a volume button, a start button, and a lock button.

The sensor component 1014 may include one or more sensors for providing condition assessments of the various aspects of the apparatus 1000. For example, the sensor component 1014 may detect the on/off state of the apparatus 1000, the relative positioning of the components, such as the components can be the display and keypad of the apparatus 1000, and the sensor component 1014 may also detect position changes of the apparatus 1000 or any component thereof, presence or absence of the user contact with the apparatus 1000, orientation, acceleration/deceleration, or the temperature changes of the apparatus 1000. The sensor component 1014 may include an approaching sensor configured to detect the presence of a nearby object without any physical contact. The sensor component 1014 may also include a light sensor, such as a CMOS or CCD image sensor, for imaging applications. In some aspects, the sensor component 1014 may also include acceleration sensors, gyro sensors, magnetic sensors, pressure sensors, or temperature sensors.

The communication component 1016 can be configured to facilitate wired or wireless communication between the apparatus 1000 and other apparatuses. The apparatus 1000 may access a wireless network based on a communication standard, such as WiFi, 2G or 3G, or a combination thereof. In an exemplary aspect, the communication component 1016 can receive broadcast signals or broadcast-related information from an external broadcast management system via broadcast channels. In an exemplary aspect, the communication component 1016 can also include a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other techniques.

In an exemplary aspect, the apparatus 1000 may be implemented by one or more application specific integrated circuits (ASICs), digital signal processors (DSPs), digital signal processing devices (DSPDs), programmable logic devices (PLDs), field programmable gate array (FPGA), a controller, a microcontroller, a microprocessor, or other electronic components for performing the vehicle cooling method described above.

In an exemplary aspect, there is also provided a non-transitory computer readable storage medium comprising instructions, such as the memory storage 1004 including the instructions. The instructions may be executed by the processor 1018 of the apparatus 800 to complete the vehicle heat dissipation method described above. For example, the non-transitory computer readable storage medium may be a ROM, a random access memory (RAM), a CD-ROM, a magnetic tape, a floppy disk, an optical data storage device, etc.

The above aspects can be implemented by software, hardware, firmware, or any combination thereof, in whole or in part. When implemented by the software, the implementation can be done in whole or in part in the form of computer program products.

The aspect of the present disclosure provides a non-transitory computer-readable storage medium storing computer programs that when executed by a processing component implement any one of the vehicle heat dissipation methods provided in the aspects of the present disclosure.

The computer programs can include one or more computer instructions. When the computer programs are loaded and executed on a computer, the process or functions in accordance with the aspects of the present disclosure can be generated in whole or in part. The computer may include a general purpose computer, a special purpose computer, a computer network, or other programmable device. The computer instructions may be stored in the computer-readable storage medium, or transferred from a computer-readable storage medium to another computer-readable storage medium. For example, the computer instructions can be transferred from a web site, a computer, a server, or a data center to another web site, computer, server, or data center, via wired network, such as coaxial cable, optical fiber, digital subscriber line (DSL), or wireless network, such as infrared, wireless, microwave. The computer-readable storage medium may be any available medium or data storage devices including the servers and data centers integrated with one or more available mediums accessible by the computers. The available mediums may be magnetic medium (floppy disks, hard disks, magnetic tapes, etc.), optical medium (DVDs, etc.), or semiconductor medium (Solid State Disk (SSD)), etc.

The aspect of the present disclosure provides a device for outputting communication message, including: a processor and a memory storage for storing instructions executed by the processor.

Here, the processor is configured to execute the method of vehicle heat dissipation mentioned in above aspects.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure can be available to those skilled in the art upon consideration of the specification and practice of the disclosure disclosed herein. The present disclosure is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

It will be appreciated that the present disclosure is not limited to the precise constructions described above and illustrated in the accompanying drawings, and that various modifications and changes may be made without departing from the scope thereof. It is intended that the scope of the present disclosure only be limited by the appended claims.

What is claimed is:

1. A method of vehicle heat dissipation, comprising:
   determining whether a vehicle is located in a safety zone;
   acquiring environment data in the safety zone when the vehicle is located in the safety zone, wherein the environment data includes information on vehicle interior environment and vehicle exterior environment; and
   controlling the vehicle to dissipate heat based on the environment data; and
   wherein the environment data includes a first temperature data including a temperature of the vehicle interior environment, and a second temperature data including a temperature of the vehicle exterior environment,
   wherein acquiring the environment data in the safety zone includes:
     acquiring the first temperature data;
     determining whether the temperature of the vehicle interior environment is greater than a temperature threshold; and
     acquiring the second temperature data when the temperature of the vehicle interior environment is greater than the temperature threshold.

2. The method of claim 1, wherein controlling the vehicle to dissipate heat based on the environment data includes:
   determining whether the temperature of the vehicle interior environment is greater than the temperature of the vehicle exterior environment; and
   controlling the vehicle to dissipate heat when the temperature of the vehicle interior environment is greater than the temperature of the vehicle exterior environment.

3. The method of claim 2, further comprising:
   controlling the vehicle to refrigerate when the temperature of the vehicle interior environment is not greater than the temperature of the vehicle exterior environment.

4. The method of claim 1, wherein the environment data includes weather information indicating weather in an area of the safety zone, and wherein controlling the vehicle to dissipate heat based on the environment data includes:
   determining whether the weather in the area of the safety zone matches preset weather based on the weather information; and
   controlling the vehicle to dissipate heat when the weather in the area of the safety zone matches the preset weather.

5. The method of claim 1, wherein determining whether the vehicle is located in the safety zone includes:
   acquiring geographic location information of the vehicle; and
   determining that the vehicle is located in the safety zone when a geographical location indicated by the geographic location information is within the safety zone.

6. The method of claim 1, wherein determining whether the vehicle is located in the safety zone includes:
   determining whether a vehicle terminal in the vehicle is connected to a network;
   determining whether a signal strength of the network is greater than a signal threshold after determining that the vehicle terminal is connected to the network; and
   determining that the vehicle is in the safety zone when the signal strength of the network is greater than the signal threshold.

7. The method of claim 1, wherein a gravity sensor is embedded underneath the safety zone in advance, and wherein determining whether the vehicle is located in the safety zone includes:
   receiving a gravity sensing signal sent from the gravity sensor and forwarded by a server, wherein the gravity sensing signal is a signal that is generated when the gravity sensor detects gravity greater than a gravity trigger threshold; and
   determining that the vehicle is located in the safety zone based on the gravity sensing signal.

8. The method of claim 1, wherein the environment data includes a first temperature data including a temperature of the vehicle interior environment, and weather information indicating weather in an area of the safety zone;
   wherein the method further comprises:
     controlling the vehicle to stop heat dissipation when the temperature of the vehicle interior environment is not greater than a temperature threshold; or
     updating the weather information, and controlling the vehicle to stop the heat dissipation when the weather indicated by the weather information does not match a preset weather.

9. An apparatus of vehicle heat dissipation, comprising:
   a processor; and
   a memory for storing instructions executable by the processor,
   wherein the processor is configured to:
     determine whether a vehicle is located in a safety zone;
     acquire environment data in the safety zone when the vehicle is located in the safety zone, wherein the environment data includes information on vehicle interior environment and vehicle exterior environment; and
     control the vehicle to dissipate heat based on the environment data; and
   wherein the environment data includes a first temperature data including a temperature of the vehicle interior environment, and a second temperature data including a temperature of the vehicle exterior environment, and
   wherein the processor is further configured to:
     acquire the first temperature data,
     determine whether the temperature of the vehicle interior environment is greater than a temperature threshold, and
     acquire the second temperature data when the temperature of the vehicle interior environment is greater than the temperature threshold.

10. The apparatus of claim 9, wherein the processor is further configured to:
    determine whether the temperature of the vehicle interior environment is greater than the temperature of the vehicle exterior environment; and
    control the vehicle to dissipate heat when the temperature of the vehicle interior environment is greater than the temperature of the vehicle exterior environment.

11. The apparatus of claim 9, wherein the processor is further configured to:

control the vehicle to refrigerate when the temperature of the vehicle interior environment is not greater than the temperature of the vehicle exterior environment.

12. The apparatus of claim 9, wherein the environment data further includes weather information indicating weather in an area of the safety zone, and wherein the processor is further configured to:
   determine whether the weather in the area of the safety zone matches preset weather based on the weather information, and
   control the vehicle to dissipate heat when the weather in the area of the safety zone matches the preset weather.

13. The apparatus of claim 9, wherein the processor is further configured to:
   acquire geographic location information of the vehicle; and
   determine that the vehicle is located in the safety zone when geographical location indicated by the geographic location information is within the safety zone.

14. The apparatus of claim 9, wherein the processor is further configured to:
   determine whether a vehicle terminal in the vehicle is connected to a network;
   determine whether a signal strength of the network is greater than a signal threshold after determining that the vehicle terminal is connected to the network; and
   determine that the vehicle is in the safety zone when the signal strength of the network is greater than the signal threshold.

15. The apparatus of claim 9, wherein a gravity sensor is embedded underneath the safety zone in advance, and wherein the processor is further configured to:
   receive a gravity sensing signal sent from the gravity sensor and forwarded by a server; and
   determine that the vehicle is located in the safety zone based on the gravity sensing signal, wherein the gravity sensing signal is a signal that is generated when the gravity sensor detects gravity greater than a gravity trigger threshold.

16. The apparatus of claim 9, wherein the environment data includes a first temperature data including a temperature of the vehicle interior environment, and weather information indicating weather in an area of the safety zone, and wherein the processor is further configured to:
   control the vehicle to stop the heat dissipation when the temperature of the vehicle interior environment is not greater than a temperature threshold; or
   update the weather information, and control the vehicle to stop the heat dissipation when the weather indicated by the weather information does not match the preset weather.

17. A non-transitory computer-readable storage medium storing instructions that, when executed by one or more processors of a computing device, cause the computing device to:
   determine whether a vehicle is located in a safety zone;
   acquire environment data in the safety zone when the vehicle is located in the safety zone, wherein the environment data includes information on vehicle interior environment and vehicle exterior environment; and
   control the vehicle to dissipate heat based on the environment data; and
   wherein the environment data includes a first temperature data including a temperature of the vehicle interior environment, and a second temperature data including a temperature of the vehicle exterior environment, and
   wherein the instructions further cause the computing device to:
   acquire the first temperature data,
   determine whether the temperature of the vehicle interior environment is greater than a temperature threshold, and
   acquire the second temperature data when the temperature of the vehicle interior environment is greater than the temperature threshold.

\* \* \* \* \*